Aug. 18, 1970     R. G. ENGMAN     3,525,021
PRECIPITATOR RAPPER CONTROL
Original Filed Sept. 30, 1965
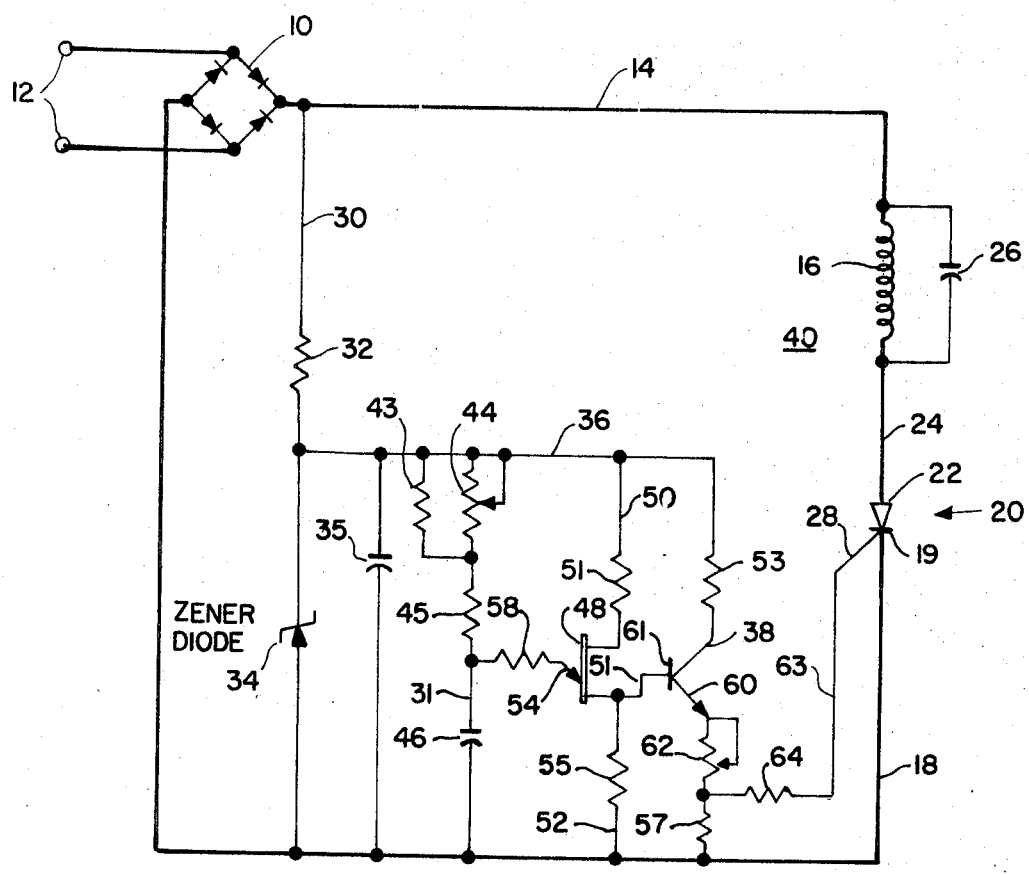
INVENTOR.
ROBERT G. ENGMAN
BY
his ATTORNEY

United States Patent Office 3,525,021
Patented Aug. 18, 1970

3,525,021
PRECIPITATOR RAPPER CONTROL
Robert G. Engman, Huntington Beach, Calif., assignor to Joy Manufacturing Company, Pittsburgh, Pa., a corporation of Pennsylvania
Continuation of application Ser. No. 491,599, Sept. 30, 1965. This application Oct. 7, 1968, Ser. No. 779,289
Int. Cl. H01h 47/18
U.S. Cl. 317—142
9 Claims

ABSTRACT OF THE DISCLOSURE

A control circuit for a precipitator rapper having a controlled switching device connected in series with the rapper operating coil, a capacitor connected across the coil and a pulse generating means for supplying gating pulses to the switching device at a selected time which pulses have an amplitude exceeding a predetermined value for a predetermined time to cause the switching device to be rendered conductive for as long as the gating pulses exceed such predetermined value and which switching device is non-conductive at the end of the half cycle in which the gating pulse falls below such predetermined value until the next succeeding gating pulse is supplied to the switching device.

---

This application is a continuation of application Ser. No. 491,599 filed Sept. 30, 1965.

This invention relates to an electrical control circuit for varying the intensity and frequency of stroke of a rapper in an electrical precipitator. The control circuit is a solid state device including adjustable means for determining the length of time an operating coil of a rapper is energized. FIG. 1 is a schematic electrical presentation of one control circuit for accomplishing the purposes of this invention.

As shown in FIG. 1 the control of this invention comprises a suitable full wave rectifier 10 having input connections 12 adapted ot be connected to a suitable source of electrical energy such as a common 115 volt alternating current source. One side of the output of rectifier 10 is connected by a conductor 14 to one end of an operating coil 16 of a precipitator rapper. Inasmuch as the construction and operation of a precipitator rapper is well known and does not constitute a part of this invention such rapper has not been illustrated. As is known one construction of such a rapper has a stationary anvil which is struck by a movable hammer and the hammer is moved from the anvil upon energization of the coil 16. In addition the intensity of the hammer blow on the anvil can be varied by varying the energy input to the coil 16 so that the hammer is lifted a varying distance with respect to the anvil. Other rapper constructions which accomplish essentially the same result are possible.

The other side of the output of rectifier 10 is connected by a conductor 18 to a cathode 19 of a silicon controlled rectifier or SCR 20 with the anode 22 thereof being connected by a conductor 24 to the other end of coil 16. A capacitor 26 is connected in parallel with the coil 16 which capacitor 26 in conjunction with SCR 20 controls the electrical energization of the coil 16.

SCR 20 has a gate 28 which when energized to a predetermined value permits the silicon controlled rectifier 20 to be electrically conductive for a selected number of half cycles of the output of rectifier 10 at the conductor 14 as long as the input voltage to the gate 28 is of sufficient magnitude at the end of each half cycle. In order to make the SCR 20 selectively conductive a control circuit therefore is also connected across the output of the rectifier 10. As shown, a conductor 30 having a current limiting resistor 32 therein and a Zener diode 34 subsequently in series therewith is connected across conductors 14 and 18 to provide a low voltage control. A filter condenser 35 is suitably connected across the output of the diode 34 to prevent undesirable ripple on the output side of the diode 34. As shown a conductor 36 is connected between resistor 32 and diode 34 and extends to the circuit from the collector 38 of a transistor current amplifier 40 and the capacitor 35 is connected between conductors 18 and 36. A variable resistor 44 is sequentially connected in series with a current limiting resistor 45 and a capacitor 46 by a conductor 31, the series circuit being in parallel with the capacitor 35. A resistor 43 is connected in parallel with the resistor 44.

A unijunction transistor 47 having an elongated silicon base 48 is provided which has a pair of spaced input terminals to which input conductors 50-52 are connected. Transistor 47 has a P-type junction between its input terminals to which an emitter 54 is connected. Emitter 54 is connected in series with one end of a current limiting resistor 58 the other end of which resistor 58 is connected to conductor 31 between the capacitor 46 and the resistor 45. Input conductor 50 has a current limiting resistor 51 therein and is connected to conductor 36 between the variable resistance 44 and a current limiting resistor 53 in series with the collector 38. A resistor 55 is provided in conductor 52 with the other end of conductor 52 being connected to conductor 18.

Amplifier 40 has a base 61 which is connected by a conductor 51 to conductor 52 intermediate the resistor 55 and the base 48. Amplifier 40 has an emitter 60 the output end of which is connected to one end of a variable resistance 62 the other end of which resistance 62 is connected to one end of a bleed-off resistor 57. The other end of resistor 57 is connected to conductor 18 intermediate the SCR 20 and the connection of the conductor 52 thereto. Gate 28 of SCR 20 is connected by a conductor 63 having a current limiting resistor 64 therein intermediate the resistors 62 and 57.

With the circuit previously described the unijunction transistor 47 in connection with variable resistor 44 and capacitor 46 determined the interval between conduction periods of amplifier 40. The emitter voltage subsequently referred to in this explanation is measured from conductor 18 to emitter 54. The emitter 54 of unijunction transistor 47 conducts practically no current when emitter 54 is at a voltage lower than about 60% of the voltage between conductors 36 and 18. The emitter 54 will fire or start to conduct when the voltage of the emitter 54 is higher than about 60% of the voltage between conductors 36 and 18 and current will flow from the emitter 54 through the base 48 and conductor 61 to the parallel combination of resistor 55 and current amplifier 40. Such conduction of the emitter 54 continues until the voltage at the emitter 54 is reduced to about 15% of the voltage between conductors 36 and 18, at which time the emitter 54 reverts to a non-conducting state.

Starting at the time power is connected to the circuit a voltage appears between conductors 36 and 18, capacitor 46 is discharged, and there is no voltage at or, for practical purposes, current flow to the emitter 54 as it is connected through resistor 58 to the top of capacitor 46. At start up, a small current flows from conductor 36 through resistor 58, base 48, and conductor 52 to conductor 18. Resistor 55 allows this small current to flow through conductor 52 to conductor 18 without raising the voltage of base 61 high enough above conductor 18 to cause current amplifier 40 to conduct. That is, resistor 55 bleeds off the idling current through the transistor 47.

Subsequently, current gradually flows through the resistors 44 and 45 in series to gradually charge capacitor 46 and gradually raise the potential or voltage of emitter 54. A predetermined time will be required for the capacitor 46 to charge to the required voltage to cause the emitter 54 to fire. This time may be varied by the adjustment of the variable resistor 44 and will encompass a number of half cycles of the rectifier 10 output. The voltage of emitter 54 continues to rise until emitter 54 starts to conduct at which time capacitor 46 starts to discharge through resistor 58, emitter 54, a portion of the base 48, and the parallel combination of resistor 55 and current amplifier 40. The discharge current from capacitor 46 is large in comparison to the current which previously flowed through resistors 44 and 45 to charge capacitor 46, and is also large compared to the transistor 47 idling current which previously flowed through resistor 55. The discharge current from capacitor 46 causes increased voltage drop across resistor 55 which is sufficiently large to cause conduction of amplifier 40. With the circuit of this invention the discharge time for capacitor 46 is much shorter than its charge time.

As soon as emitter 54 starts to conduct, its voltage starts to drop since capacitor 46 is discharging and such voltage drop continues until the point is reached at which emitter 54 conduction ceases. At this time emitter 54 reverts to a nonconducting state and charging of capacitor 46 is again started in the same manner as heretofore described. Thus, resistor 44 varies the interval between raps, performing its timing function in conjunction with capacitor 46.

Resistor 45 is not necessary if the range over which variable resistor 44 can be varied as restricted. If the voltage drop across resistors 44 and 45 becomes too low, the rate capacitor 46 can be charged will become greater than the rate at which the transistor 47 discharges the capacitor 46 and the emitter 54 will not stop conducting after once being started. Thus, resistor 45 permits resistor 44 to be reduced to zero without eliminating the timing function of the emitter 54.

Amplifier 40, when conducting, has a voltage output pulse which is of a sawtooth shape, that is, the voltage output rises abruptly and then falls off gradually in magnitude and such output pulse appears across the resistors 57 and 62. When the resistive value of resistor 62 is small compared to the resistive value of resistor 57, nearly all of the output voltage from amplifier 40 appears across resistor 57. The voltage across resistor 57 appears across the resistor 64 and the gate 28 of the SCR 20 and when the voltage applied to gate 28 is above the threshold voltage required to fire the SCR 20 the SCR 20 becomes conductive and remains conductive for so long as the voltage applied to gate 28 is above such threshold voltage at the end of each half cycle of the rectifier 10 output at conductor 14. When SCR 20 is conductive for a long period, as when the value of resistor 57 is larger compared to the value of the resistor 62, the output of the rectifier 10 flows through the SCR 20 and the coil 16 for a longer period of time over a number of half cycles so that the hammer of the rapper si lifted through its full stroke. When the emitter 54 becomes non-conductive, as previously explained, the amplifier 40 has no output and consequently there is no voltage across the resistor 57 and the voltage of the gate 28 falls below the voltage required to maintain the SCR 20 conductive at the end of each half cycle of the rectifier 10 output and as the current through the SCR 20 goes to zero the SCR 20 thus turns off. When SCR 20 becomes non-conductive the coil 16 is deenergized and the hammer then falls through its entire stroke and strikes the anvil. As the value of resistor 62 is increased less voltage appears across the resistor 57 and the voltage applied to gate 28 which is required to fire and maintain the SCR 20 conductive is of shorter duration (a lesser number of half cycles of the rectifier 10 output) than the period of time such voltage is so applied when the value of resistor 62 is less. Consequently since such voltage is applied to gate 28 for a shorter period the SCR 20 becomes non-conductive sooner, i.e. after a smaller number of half cycles of the rectifier 10 output. By so increasing the value of the resistor 62 the period the SCR 20 is conductive is shortened such that the hammer is released, that is coil 16 is deenergized, before the hammer has traveled through its entire stroke away from the anvil. Thus, by varying the value of the resistor 62 the impact of the hammer on the anvil can be varied; that is by varying the voltage across resistor 57 the intensity of the hammer rap can be varied.

As is known, coil 16 is an inductive load and there is a decay current flowing through the coil 16 after the SCR 20 has become non-conductive. Accordingly, capacitor 26 is connected in parallel with the coil 16 in that the decay current flow in coil 16 will be rapidly dissipated in charging the condenser 26.

A preferred embodiment of this invention having been described and illustrated it is to be realized that modifications therein can be made without departing from the broad spirit and scope of this invention. It is therefore respectfully requested that this invention be interpreted as broadly as possible and be limited only by the prior art.

What is claimed is:

1. In a control circuit for controlling the energization and deenergization of an operating coil of a rapper being operative with a source of full wave rectified voltage, the combination of: a controlled switching device operatively connected in series with said operating coil and said source; capacitance means operatively connected across said operating coil; and pulse generating means receiving operating voltage from said source and supplying gating pulses to said controlled switching device and supplying succeeding of said pulses at a selected time, said gating pulses having an amplitude exceeding a predetermined value for a predetermined time and causing said controlled switching device to be rendered conductive for as long as the supplied gating pulse exceeds said predetermined value at the end of each half cycle of said full wave rectified voltage to energize said operating coil from said source for a predetermined number of half cycles of said full wave rectified voltage, said controlled switching device being rendered nonconductive at the end of the half cycle in which the supplied gating pulse falls below said predetermined value and said operating coil being deenergized for a predetermined number of half cycles of said full wave rectified voltage until the next succeeding of said gating pulses is supplied to said controlled switching device.

2. The combination of claim 1 wherein: said pulse generating means includes timing means for controlling said selected time at which said gating pulses are supplied.

3. The combination of claim 1 wherein: said pulse generating means includes amplifying means for controlling the amplitude of said gating pulses so that said pulses have said predetermined value for said predetermined time.

4. The combination of claim 3 wherein: said pulse generating means includes timing means for controlling said selected time at which said gating pulses are supplied, said amplifying means being responsive to said timing means to supply said gating pulses at said selected time.

5. The combination of claim 4 wherein: said pulse generating means includes reference means for establishing a reference voltage in response to said supply voltage, said timing means includes a timing circuit comprising a variable timing impedance and a capacitor being charged via said variable impedance from said reference voltage and a voltage responsive device operatively coupled to said capacitor and being operative to conduct when said capacitor reaches a predetermined voltage, said selected time being controlled by the adjustment of said variable impedance.

6. The combination of claim 5 wherein: said amplifying means includes a variable output impedance for adjusting the amplitude of said gating pulses.

7. The combination of claim 5 wherein: said voltage responsive device comprises a unijunction transistor.

8. In a control circuit for controlling the energization and deenergization of an operating coil of a rapper the combination of: a source of full wave rectified voltage, a controlling switching device operatively connected in series with said operating coil and said source; capacitance means operatively connected across said operating coil; and pulse generating means receiving operating voltage from said source and supplying gating pulses to said controlled switching device and supplying succeeding of said pulses at a selected time, said gating pulses having an amplitude exceeding a predetermined value for a predetermined time greater than the duration of any half cycle supplied from such source and causing said controlled switching device to be rendered conductive for as long as the supplied gating pulse exceeds said predetermined value at the end of each half cycle of said full wave rectified voltage to energize said operating coil from said source for a predetermined number of half cycles of said full wave rectified voltage, said controlled switching device being rendered nonconductive at the end of the half cycle in which the supplied gating pulse falls below said predetermined value and said operating coil being deenergized for a predetermined number of half cycles of said full wave rectified voltage until the next succeeding of said gating pulses is supplied to said controlled switching device.

9. A control circuit as set forth in claim 8 in which said predetermined time is greater than the duration of a plurality of sequential half cycles supplied from such source.

References Cited

UNITED STATES PATENTS

| | | | |
|---|---|---|---|
| 2,843,147 | 7/1958 | Penther. | |
| 3,182,228 | 5/1965 | Gambill et al. | 317—148.5 |
| 3,195,029 | 7/1965 | Gilbreath | 318—246 |
| 3,205,411 | 9/1965 | Culbertson | 317—142 |
| 3,247,912 | 4/1966 | Reynolds. | |
| 3,333,175 | 7/1967 | Klyce | 307—141 X |
| 3,350,606 | 10/1967 | Hirsch | 307—141 X |
| 3,406,295 | 10/1968 | Corey | 317—142 X |

LEE T. HIX, Primary Examiner

U.S. Cl. X.R.

307—132, 293; 317—148.5